United States Patent [19]

Solomon

[11] 3,870,371

[45] Mar. 11, 1975

[54] DRIVEN PLASTIC SMALL VEHICLE WHEEL

[75] Inventor: Milton Solomon, Schaumburg, Ill.

[73] Assignee: Circle Engineering Co., Inc., Arlington Heights, Ill.

[22] Filed: Oct. 25, 1972

[21] Appl. No.: 300,468

[52] U.S. Cl. .................................. 301/1, 301/111
[51] Int. Cl. ............................................ B60b 37/04
[58] Field of Search ...... 301/111, 1, 122; 287/53 R; 403/1, 359

[56] References Cited
UNITED STATES PATENTS

| | | | |
|---|---|---|---|
| 1,001,697 | 8/1911 | Sharp | 301/1 |
| 1,586,959 | 6/1926 | Blake | 269/165 |
| 2,162,902 | 6/1939 | Adams | 287/53 R |
| 2,693,393 | 11/1954 | Heth | 301/1 |

Primary Examiner—M. Henson Wood, Jr.
Assistant Examiner—Reinhard J. Eisenzopf
Attorney, Agent, or Firm—Silverman & Cass, Ltd.

[57] ABSTRACT

A small integral, molded, plastic vehicle wheel comprising a rim, a hub and connecting support structures. A coaxial sleeve is formed integral with said hub and is joined thereto by a plurality of radial spokes or ribs extending along the length of said sleeve and hub. A metal cylindrical bushing or coupling member is provided having a plurality of circumferential slots opening to one end of the bushing and at least one shallow slot opening to the other, opposite, end thereof. The bushing is adapted to be inserted between the hub and the sleeve with the ribs engaged in the circumferential slots. The sleeve extends outward of the hub to provide additional support for the bushing. The drive shaft is accommodated interior of the sleeve and carries a passage which is adapted to be aligned with the shallow slot of the bushing. A pin may be inserted through the shallow slot into the aligned passage carried by the shaft for coupling the shaft to the bushing.

23 Claims, 9 Drawing Figures

3,870,371

DRIVEN PLASTIC SMALL VEHICLE WHEEL

RELATED APPLICATIONS

The invention herein is an improvement upon the wheel structures such as disclosed in U.S. Pat. Nos. 3,604,756 issued Sept. 14, 1971 and 3,640,584 issued Feb. 8, 1972.

FIELD OF THE INVENTION

This invention relates to wheels for use on small vehicles such as lawn mowers, carriages and movable industrial equipment, and more particularly, is concerned with plastic molded wheels which are intended to be driven in contrast to free wheeling structures.

Small wheels of the general type with which this invention is concerned have been manufactured out of pressed steel, and more recently out of injection molded plastics. The steel wheels have had more widespread use heretofore because of their substantial strength, although plastic wheels offer advantages of light weight and economy. Plastic wheels made in accordance with the aforementioned U.S. patents were very advantageous in that they are capable of supporting substantial loads in comparison to other plastic molded wheel structures. In U.S. Pat. No. 3,604,756 there was first disclosed a plastic molded wheel having a rim, a hub, and connecting structure integral therewith in the form of a continuous ribbon having particular structural characteristics. In the U.S. Pat. No. 3,640,584, a small vehicle wheel of the same general structure as shown in the previously mentioned patent was disclosed in combination with a bearing assembly disposed and retained within the hub of said wheel and sealing means were provided to retain the bearing assembly within the hub.

The small vehicle wheel structures of the aforementioned patents have been widely accepted for use as free wheeling purposes but are relatively limited in their application to uses where driven wheels are concerned.

When considering driven wheels, drive means or drive couplings were secured to the driven wheel by welding or other permanent attachment. This involves the use of metal hubs or at least metal sleeves, which could be tightly introduced within the hub and still be capable of securement to or coupling with the drive means. Hence plastic wheels have little, if any, use where a driven wheel was required. In addition, the use of stock wheels instead of specially designed wheels as driven wheels would be advantageous from an inventory point of view.

SUMMARY OF THE INVENTION

A plastic molded driven or drivable vehicle wheel which includes a rim, a hub, spoke means in the form of a continuous ribbon between the hub and the rim, rib means disposed along the hub integral therewith, and bushing means of substantially cylindrical configuration, said bushing means including a plurality of first slot means formed in said bushing and opening to one end thereof, said bushing means adapted to engage said hub with said first slot means engaging said rib means and means for coupling the drive shaft to said bushing whereby to drive said vehicle wheel.

DESCRIPTION OF THE PREFERRED EMBODIMENTS

Figure 1:
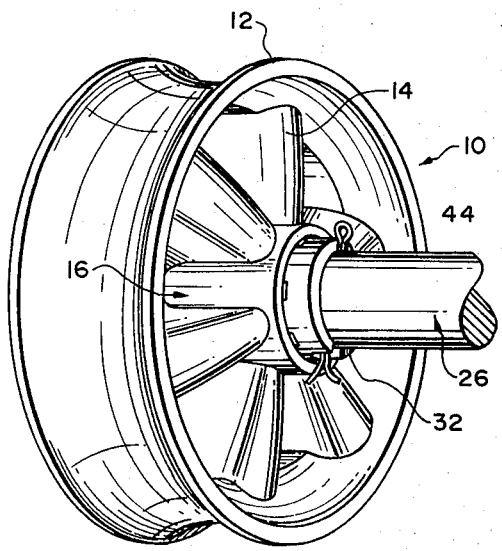
FIG. 1 is a perspective view of the wheel and bushing constructed in accordance with the invention.
Figure 2:
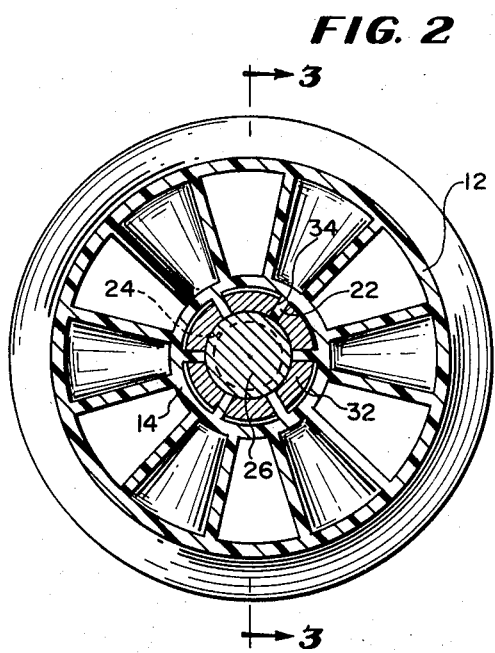
FIG. 2 is a side sectional view of the wheel illustrated in FIG. 1.
Figure 3:
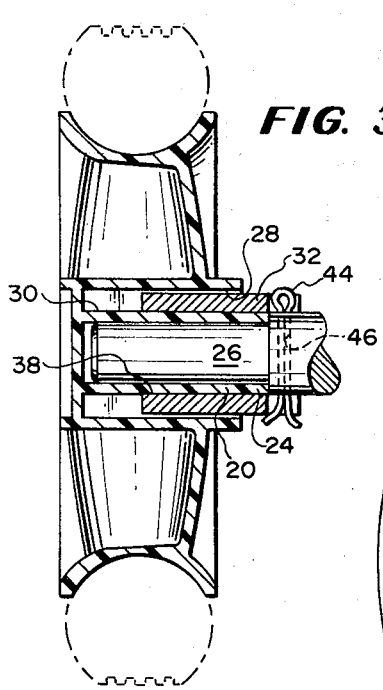
FIG. 3 is a sectional view taken along lines 3—3 of FIG. 2 viewed in the direction of the arrows.

A plastic molded wheel constructed in accordance with the invention is illustrated in FIG. 1 and designated generally by reference numeral 10. The wheel mounts a tire (shown in phantom in FIGS. 2 and 3) and comprises a rim 12, a connecting web 14, and a hub member 16. In the embodiment shown in FIG. 1, the connecting support member 12 is an undulated web such as disclosed in U.S. Pat. No. 3,604,756. The web 14 defines a symmetrical array of spoke portions integral at their outer end with the arcuate floor of the rim 12 and at their inner ends, extending substantially the length of the hub. The outer ends of said spoke portions follow the contour of the rim 12 while the inner ends extend in plane substantially normal to the axis of the hub.

The hub is provided with an inner sleeve 20 of tubular configuration coaxial therewith. A plurality of axially extending radial ribs 22 are formed along the sleeve 20 integral with the hub and sleeve. Ribs 22 extend substantially along the entire length of the inner wall of the hub 16. The sleeve 20 is selected to be of a dimension slightly longer than the hub to define an extension or outer rim portion 24. The internal diameter of the sleeve 20 is selected so as to accommodate the axle or driven shaft 26 of a small vehicle (not shown).

Figure 4:
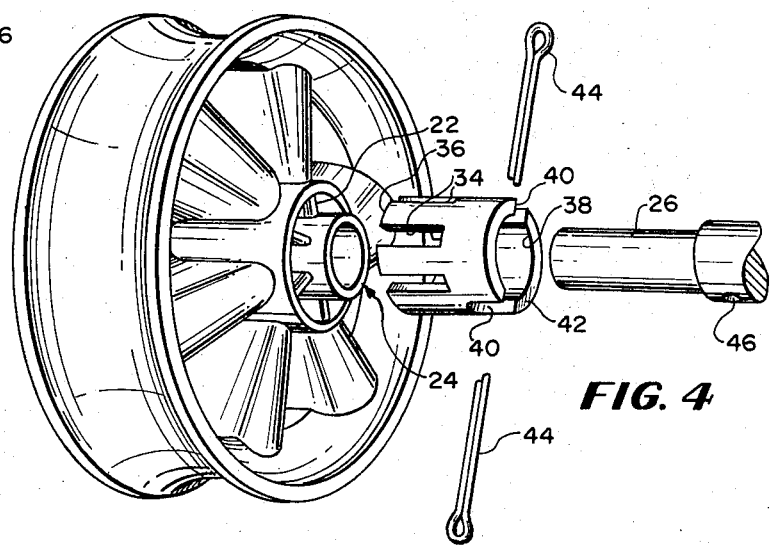
FIG. 4 is an exploded fragmentary view of the wheel illustrated in FIG. 1.

The shaft 26 may be stepped as shown in FIG. 4 so that the smaller portion fits into the sleeve 24. The larger portion engages the inner wall of the cylindrical bushing 32 provided for coupling the driven shaft to the wheel to define a driving connection therebetween. The bushing 32 is formed preferably of metal and has a wall thickness preferably only slightly less than the distance between the inner wall 28 of the hub and the outer wall 30 of the sleeve 20 of wheel 10. Bushing 32 is provided with first slot means in the form of a plurality of axial slots 34 circumferentially symmetrically arranged and opening to one end face 36 of the bushing 32. The slots 34 have a width substantially the same as the thickness of ribs 22, whereby frictionally to receive the same. The inner diameter of passageway 38 of bushing 32 is selected substantially equal to the outer diameter of sleeve 20 so that the bushing 32 can be engaged frictionally upon said sleeve 20 with the ribs 22 received within slots 34. Second slot means in the form of a pair of diametrically opposite slots 40 is provided in the opposite end face 42 of the bushing 32, these slots 40 being much shallower than slots 34. Fastening means such as cotter pins 44 may be passed through the slots 40 say from opposite directions, and through passage 46 carried by shaft 26 so that the bushing 32 is coupled to said shaft 26. The sleeve may be tapered so that it is of slightly wider inner diameter at its entrance end. This slight taper provides enough draft to permit removal from the mold. The end wall may be removed if desired. Otherwise it serves to seal the exterior facing side of the wheel. A passageway or pin-hole spaced from the end face 42 may substitute for slots 40.

Figure 5:
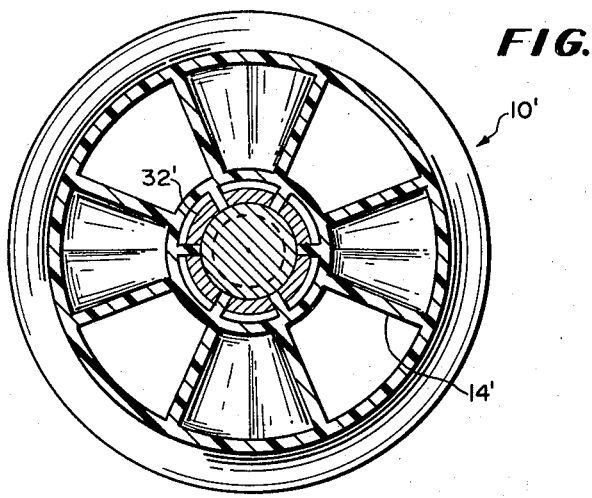
FIG. 5 is an elevational sectional view of a modified embodiment of the invention.

Referring now to FIG. 5, a modified embodiment of the invention is designated generally by reference character 10′ and is substantially identical to the wheel 10 except in three particulars. First, wheel 10′ has four spoke formations 14′ in lieu of the six formations found in wheel 10. Second, the member 32′ is formed of lesser wall thickness than was bushing 32. Accordingly there is a savings in material and weight; and the fit between the bushing and hub may be loose when compared to the engagement of bushing 32 in hub 16.

Figure 6A:
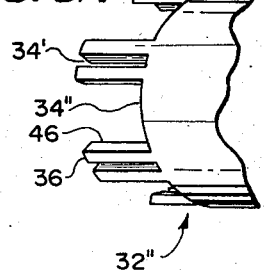
FIG. 6A is a fragmentary detail of the bushing means used with the wheel illustrated in FIG. 6.
Figure 6:
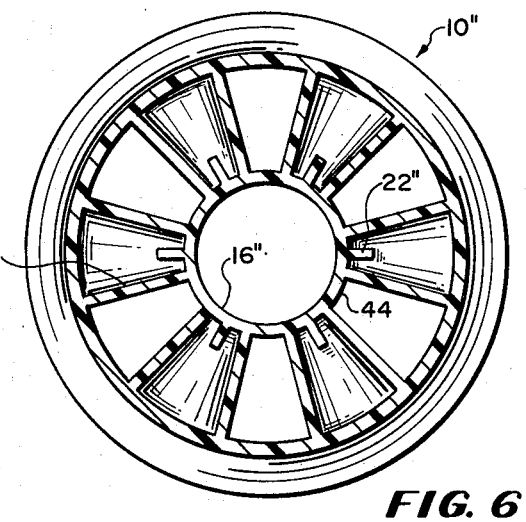
FIG. 6 is an elevational sectional view of another modified embodiment of the invention.

Another modified embodiment of the invention is illustrated in FIGS. 6 and 6A, being designated generally by reference character 10″. In wheel 10″, the rib means found in wheel 10 in the form of radial ribs 22, here take the form of radial ribs 22″ formed integral with the outer wall 44 of the hub 16″ along the length of said hub, and between the spoke formations which comprise the connecting structure 14″ for the wheel 10″.

The bushing member 32″ utilized with wheel 10″ has an inner diameter selected to enable the hub 16″ to be received partially therewithin, with the slot means including narrow slots 34 alternating with wider slots 34″ as shown in FIG. 6A. The wider slots 34″ are of size and configuration to receive the spoke formations 14″ therein at the connection thereof to the hub 16″. The ribs 22′ are engaged within slots 34′. One could describe the bushing 32″ as having tongue means in the form of tongue portions 46, each of which carries a narrow slot opening 34′ to the end face 36″ of the bushing 32″. Spaces between the tongues 46 define the slots 34″.

Figure 7:
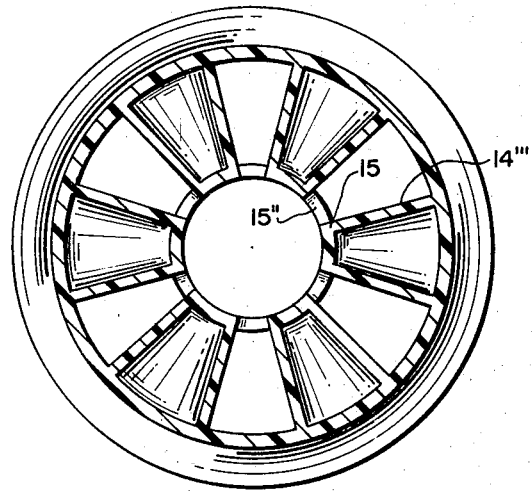
FIG. 7 is an elevational sectional view of a further modified form of the invention.
Figure 7A:
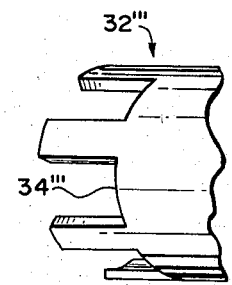
FIG. 7A is a fragmentary detail of the bushing means modified for use with the wheel illustrated in FIG. 7.

As illustrated in FIGS. 7 and 7A, the bushing 32″ may be formed with only the wide slots 34‴ formed in circumferential wall thereof. Here the rib means takes the form of the lower ends 15″ of spoke formations 14‴. Here the hub may accommodate a bearing cage (not shown) if desired. Bushing 32‴ is accommodated upon the wheel with the said hub adjacent ends 15 of the spoke formations 14‴ received within the slots 34‴. Bushings 32, 32′, 32″ and 32‴ can be molded or otherwise formed of plastic material.

Another advantage of the invention is that stock wheels can be utilized as driven wheels instead of specially designed wheels for such purpose.

What I claim is:

1. A vehicle wheel for mounting to a cylindrical shaft and driven thereby, said wheel comprising a rim, a cylindrical hub, connecting structure joining the rim to the hub, the hub having a cylindrical bore and radially extending rib means formed along a substantial portion of the axial length of the hub, hollow cylindrical bushing means constructed and arranged for securement in coupled condition with said hub and having first through slot means formed in one end face of said bushing means circumferentially spaced about the said end face and extending only part way along the circumferential wall of said bushing means and positively engageable with said rib means received in said first slot means and means coupling said shaft to said bushing whereby a driving connection is established through said hollow bushing between said wheel and shaft.

2. The wheel as claimed in claim 1 in which said rib means comprise radial parallel circumferentially spaced ribs formed integral with the inner wall of said hub.

3. The wheel as claimed in claim 1 in which said rib means comprise radial ribs are formed integral with the outer wall surface of said hub.

4. The wheel as claimed in claim 3 in which said connecting structure between the hub and rim is in the form of an undulating web defining radial spoke formations and said radial ribs are disposed between each spoke formation.

5. The wheel as claimed in claim 4 in which said first slot means includes slots of sufficient width capable of receiving said spoke defining formations adjacent said hub.

6. The wheel as claimed in claim 3 in which said bushing means fits over the hub and engages said rib means.

7. The wheel as claimed in claim 6 in which said one end of said bushing includes tongue means extending outward from said end face, said tongue means carrying said first slot means and being spaced circumferentially about said end face a distance sufficient to enable a non-interfering fit of bushing and wheel with said rib means engaged within said first slot means.

8. A vehicle wheel for mounting to a cylindrical shaft and driven thereby, said wheel comprising a rim, a cylindrical hub, connecting structure joining the rim to the hub, the hub having a cylindrical bore and radially extending rib means formed along a substantial portion of the axial length of the hub, hollow cylindrical bushing means constructed and arranged for securement in coupled condition with said hub and having first slot means formed in said bushing means opening to one end face thereof and adapted to receive said rib means, said rib means being engageable within said first slot means, and means coupling said shaft to said bushing, said rib means being circumferentially spaced about and integral with the inner wall of said hub, and an axially extending sleeve telescopically disposed coaxially within and integral with said hub, said hub and sleeve being bridged by said rib means.

9. The wheel as claimed in claim 8 in which the inner diameter of said sleeve is selected frictionally to engage the shaft.

10. The wheel as claimed in claim 8 in which said bushing means comprises a cylindrical bushing member having an axial bore of size and configuration capable of accommodating at least a portion of said sleeve therein.

11. The wheels as claimed in claim 10 in which said first slot means comprise plural spaced elongate slots formed in the circumferential wall of said bushing and arranged extending parallel to the axis thereof, said slots opening to said one end face of said bushing member.

12. The wheel as claimed in claim 11 in which passage means are provided in the circumferential wall of said bushing at the opposite end thereof and said means coupling said shaft to said bushing comprise said second slot means, passage means formed in said shaft and adapted to be aligned with said passage means of the bushing and pin means receivable within said bushing passage means and passing therethrough for retaining said shaft and bushing in coupled relationship.

13. The wheel as claimed in claim 10 in which said first slot means are formed in the circumferential wall of said bushing arranged parallel to the axis thereof and opening to one end face of said bushing, first passage means formed in the circumferential wall of said bushing at the opposite end thereof and said means coupling said shaft to said bushing comprise said second slot means, second passage means formed in said shaft and adapted to be aligned with said first passage means and pin means receivable within said first and second passage means and passing therethrough for retaining said shaft and bushing in coupled relationship, said first slot means comprising elongate symmetrically arranged slots formed about the axis of said bushing.

14. The wheel as claimed in claim 13 wherein said passage means comprises slots opening to the opposite end face of said bushing.

15. The wheel as claimed in claim 8 wherein the bushing means comprises a cylindrical bushing having an axial bore capable of receiving at least a portion of the sleeve therein and a circumferential wall having a thickness less than the difference between the inner diameter of the hub and the outer diameter of said sleeve.

16. The wheel as claimed in claim 8 in which said sleeve has an end portion thereof protruding outward of said hub, said portion received within said bushing on engagement of said rib means within said first slot means.

17. In a vehicle wheel mountable to a cylindrical shaft and having a rim, a hub, connecting support structure integral with said rim and hub joining the rim to the hub, said hub having a cylindrical bore for receiving the cylindrical shaft therethrough, the invention comprising means defining a driving connection between the wheel and the shaft, said means comprising radial rib means formed on said hub along substantially the full length thereof and arranged about the circumference of said hub, a hollow bushing engageable with said hub and having first slot means formed therein opening to one end face thereof for accommodating said rib means therein and first passage means in the circumferential wall of the bushing and adjacent the oppposite face of said bushing, and pin means passing through said first passage means, second passage means in the shaft alignable with said first passage means to accommodate the pin means for retaining said bushing to the shaft.

18. The wheel as claimed in claim 17 in which said rib means includes longitudinal ribs integral with the wall of the hub and extending radially inward of said hub circumferentially spaced about the axis thereof.

19. The wheel as claimed in claim 17 wherein said connecting structure comprises an undulating web defining a plurality of radial spoke formations, the inner ends integral with said hub and having the walls thereof extending in planes normal to the axis of said hub, said inner ends defining said radial ribs and said bushing means capable of seating upon said hub with said inner ends engaged within said slot means.

20. In a vehicle wheel mountable to a cylindrical shaft and having a rim, a hub, connecting support structure joining the rim to the hub, the hub having a cylindrical bore for receiving the cylindrical shaft therethrough, the invention comprising means defining a driving connection between the wheel and the shaft, said means comprising radial rib means formed on said hub along the length thereof and about the circumference of said hub, bushing means adapted to be engaged to said hub and having first slot means opening to one end face thereof for receiving said rib means and second slot means adjacent the opposite face thereof, and pin means passing through said second slot means, passage means in the shaft adapted for alignment with said second slot means to accommodate the pin means for retaining the bushing to the shaft and an axial sleeve telescopically engaged within said hub, the hub and sleeve being bridged by said rib means.

21. The wheel as claimed in claim 20 in which said hub, ribs and sleeve are formed as a unitary unit.

22. In a vehicle wheel mountable to a cylindrical shaft and having a rim, a hub, connecting support structure integral with said rim and hub joining the rim to the hub, said hub having a cylindrical bore for receiving the cylindrical shaft therethrough, the invention comprising means defining a driving connection between the wheel and the shaft, said means comprising radial rib means formed on said hub along substantially the full length thereof and arranged about the circumference of said hub, a hollow bushing engageable with said hub and having first through slot means formed in the wall thereof opening to one end face thereof for accommodating said rib means therein and means establishing a rotation transmitting connection between said shaft and said bushing comprising a slot and key coupling established therebetween.

23. The wheel as claimed in claim 22 in which said slot and key coupling comprises first passage means formed in the circumferential wall of the bushing and adjacent the opposite face of said bushing and pin means passing through said first passage means, second passage means in the shaft alignable with said first passage means to accommodate the pin means and retaining said bushing to the shaft.

* * * * *